Patented Mar. 31, 1942

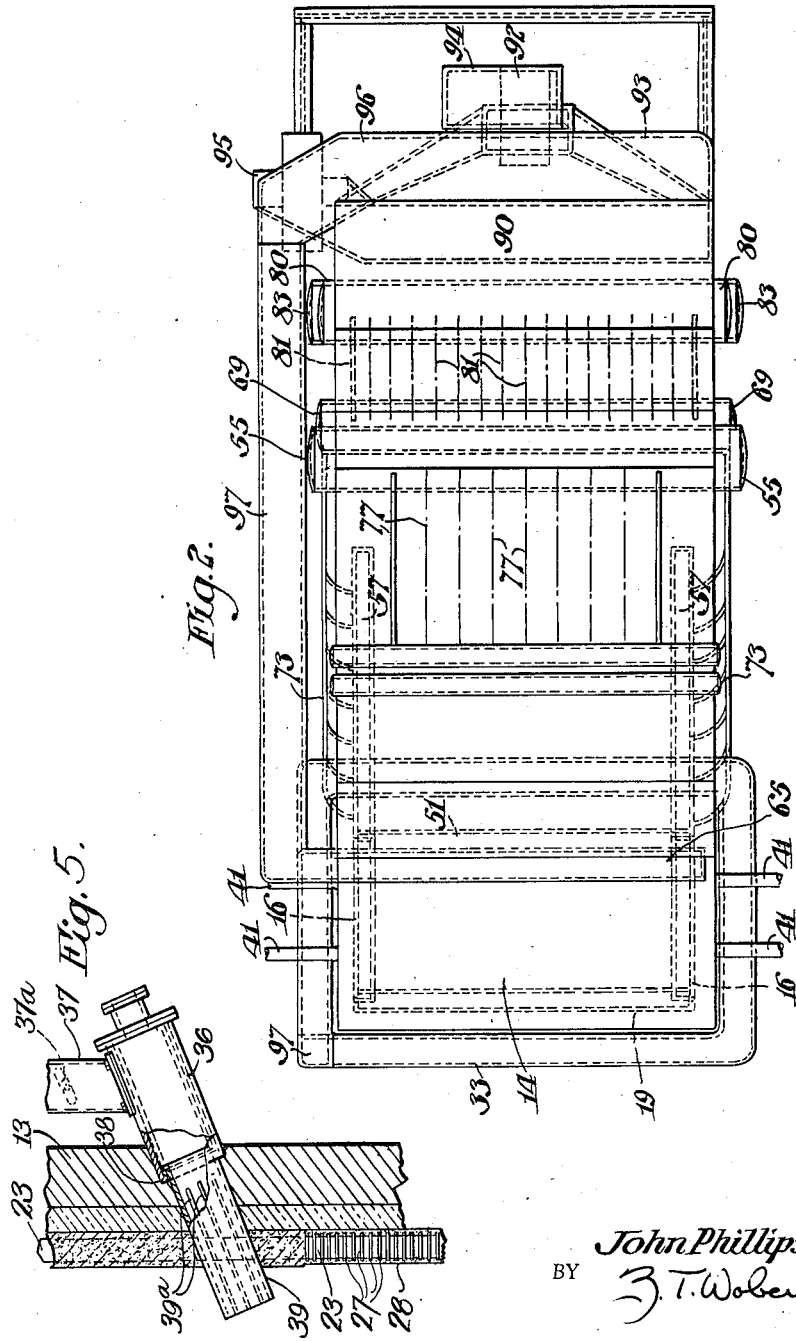

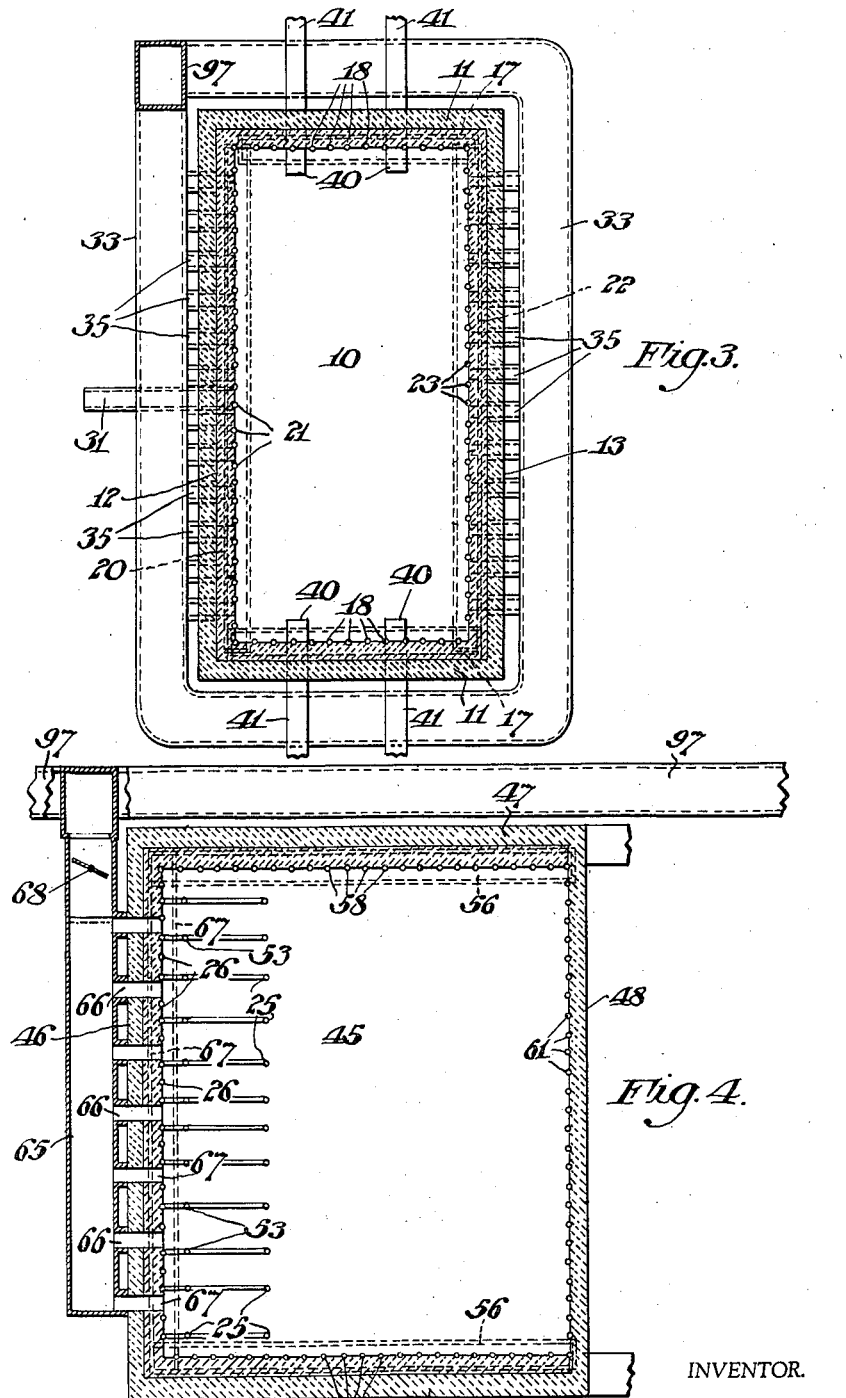

2,277,946

UNITED STATES PATENT OFFICE 2,277,946

COMBUSTION AND CHEMICAL RECOVERY FURNACE AND METHOD OF OPERATING SAME

John Phillips Badenhausen, Philadelphia, Pa., assignor of one-half to Day and Zimmermann, Incorporated, Philadelphia, Pa., a corporation of Maryland Application July 21, 1939, Serial No. 285,678

14 Claims. (Cl. 23—48)

This invention relates to furnaces and methods of operating the same, and relates more particularly to furnaces for the combustion of combustible constituents of waste liquids from industrial plants and the recovery from such liquids of valuable chemicals.

The invention further relates to apparatus and processes for the recovery of heat and chemicals from waste liquors derived from industrial plants in the alcohol, sugar and paper industries, and the utilization in the recovery of the available heat of the combustibles in the waste liquor.

The apparatus is so constructed, arranged and operated that the available heat of the combustibles contained in the waste liquid is supplied to and advantageously utilized in the furnace for carrying on the chemical recovery operations and for generating steam.

The invention further relates to improved methods of burning the combustible constituents contained in the black liquor or waste liquor from paper pulp mills and to improved methods of recovery of the chemicals in such liquor.

With the furnaces heretofore available, as well as with the methods heretofore employed in the treatment of waste liquor from paper pulp mills, the furnace construction and the methods of operating employed therewith have not been entirely satisfactory. The character of spraying heretofore employed and the manner of burning the combustible constituents in the furnace as heretofore carried out have not been as effective as desired. They have resulted in unstable furnace conditions and excessive chemical carry over and have unnecessarily decreased the efficiency of operation.

With the furnaces and methods heretofore available for the recovery of heat and chemicals from black liquor and similar materials considerable quantities of the chemicals were carried beyond the furnace by the products of combustion and deposited in the boiler space, on the boiler tubes, on the induced draft fan, or in some instances the chemicals passed out the stack.

With the systems in which the spray was delivered against the side wall constant attendance of operators has usually been found necessary.

With the prior systems also it has been considered necessary to employ Cottrel precipitators or similar devices and at frequent intervals to shut down the unit and clean the spaces in the boiler where the chemicals had deposited, remove adherent coatings from the boiler tubes and clean or replace the fan rotors.

Shut-downs and the failure to recover the highest possible quantity of chemicals in the operation of the systems heretofore available has been constantly objectionable. The units heretofore available have also been limited in size and it has frequently been thought necessary to provide a plurality of units, where one unit constructed and operated in accordance with the present invention would suffice and serve better.

It is an object of the present invention to provide a combustion and chemical recovery furnace construction and methods of operation thereof which will overcome the difficulties heretofore encountered and which may be built for greater capacity than has heretofore been possible.

It is a further object of the present invention to provide a combustion and chemical recovery furnace construction and methods of operation thereof which is satisfactory for efficient and uninterrupted operation over long periods of time.

It is also an object of the present invention to provide a furnace construction particularly adapted for the treatment of black liquor in which efficient and substantially complete combustion of the combustible materials in the black liquor will be effected, in which the yield of sodium salts recovered in the operation of the unit will be increased, and in which the reduction of the salt cake will be effectively carried out.

It is a further object of the present invention to provide an improved process for burning the combustible materials in black liquor and in the treatment increasing the recovery yield of the chemicals.

It is a further object of the present invention to provide an improved apparatus for the combustion of the combustibles in black liquor which includes a plurality of separate chambers for effecting a separate character of treatment in each of the chambers in order to provide efficient combustion and high chemical recovery.

Other objects of the invention will appear from the annexed specification and claims.

The nature and characteristic features of the invention will be more readily understood from the following description, taken in connection with the accompanying drawings forming part hereof, in which:

Fig. 2 is a top plan view of the apparatus shown in Fig. 1 and illustrating certain details of the apparatus;

Fig. 3 is a horizontal sectional view taken approximately on the line 3—3 of Fig. 1 and showing certain of the details of construction of one of the furnace chambers;

Fig. 4 is a horizontal sectional view taken approximately on the line 4—4 of Fig. 1 and showing certain of the details of construction of another of the furnace chambers; and Fig. 5 is a fragmentary vertical sectional view taken through the furnace at the bottom of one of the walls and illustrating the details of certain air nozzles employed therewith and other features.

Figure 1:
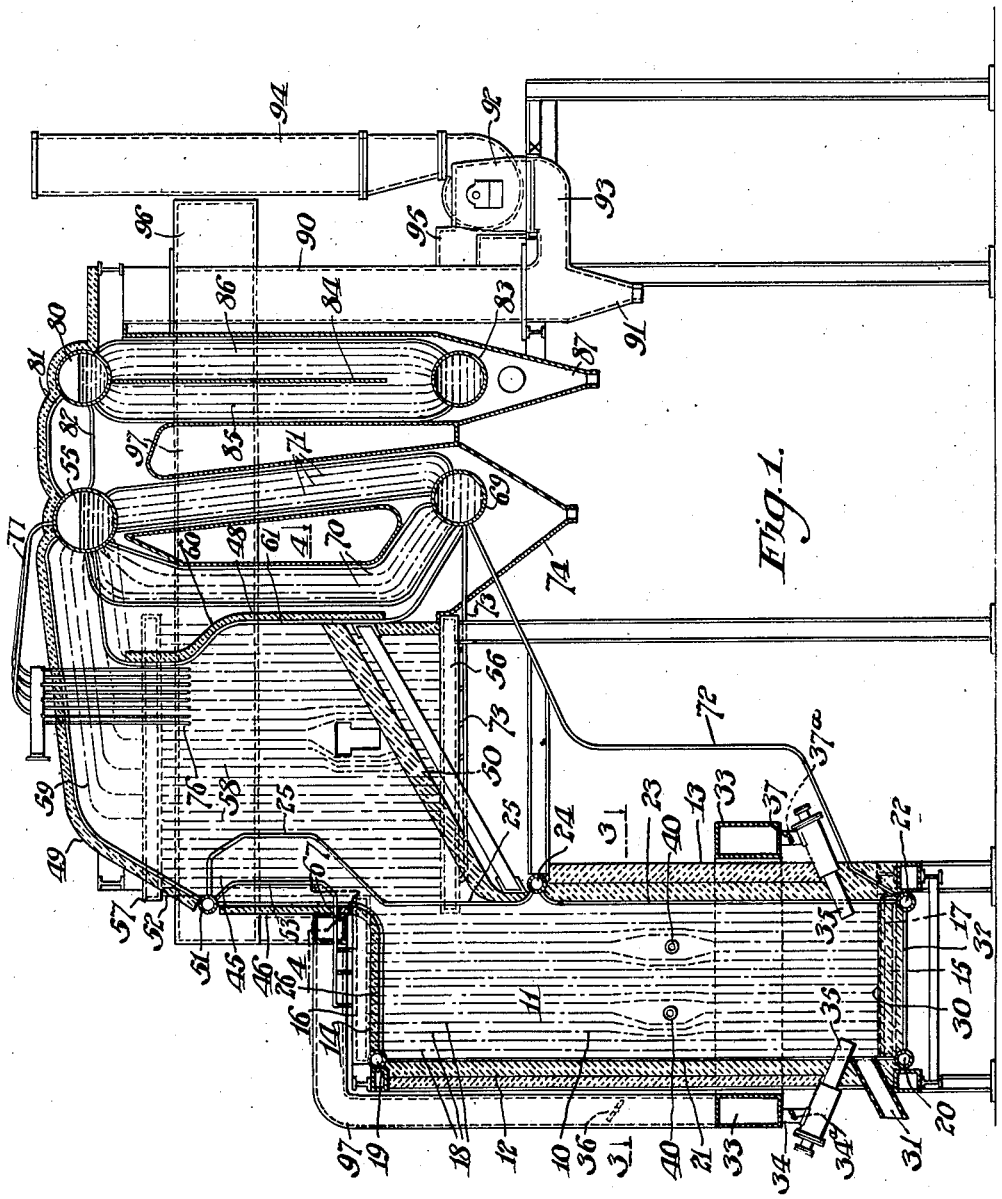
Figure 1 is a vertical central sectional view taken from the front to the back of a preferred embodiment of the apparatus of the present invention.

It will, of course, be understood that the description and drawings herein contained are illustrative merely, and that various modifications and changes may be made in the structure disclosed without departing from the spirit of the invention.

Referring more particularly to the drawings it will be seen that there is provided a furnace chamber 10 to which the concentrated waste liquor is supplied, to which the salt cake is supplied, into which air preferably preheated is supplied, from which gases at high temperature pass to another chamber, and from which the recovered chemicals in fused condition are withdrawn, as hereinafter more fully pointed out.

The walls of the furnace chamber 10 are preferably water-cooled, the heat extracted from the furnace chamber 10 by the tubes serving to prevent excessive temperatures in the walls without however reducing the temperature in the furnace chamber 10 below desired limits. The water cooling tubes of the walls of the furnace chamber 10 also provide, with a steam generating section forming part of the system, for more efficient generation of steam.

The furnace chamber 10 preferably comprises two vertically disposed side walls 11, a vertical front wall 12, a vertical rear wall 13, a top wall 14 and a bottom wall or floor 15.

The side walls 11 are each provided, near the top thereof, with an upper header 16 and near the bottom thereof with a lower header 17, the lower header 17 being connected to the upper header 16 by a bank of tubes 18 relatively closely spaced, the bank being exposed over the major portion of its length to the radiant heat within the furnace chamber 10.

The front wall 12 is provided near the top thereof with an upper header 19 and near the bottom thereof with a lower header 20, the header 20 being connected to the header 19 by a bank of riser tubes 21, which tubes are exposed for the greater portion of their length to the radiant heat of combustion within the furnace chamber 10.

The side walls 11 and the front wall 12 of the furnace chamber 10 extend between the bottom wall or floor 15 and the top wall 14 to provide a chamber which is relatively high and also relatively broad.

The upper portion of the rear wall 13 is spaced from the top wall 14 to provide for the passage from the furnace chamber 10 of hot gases and the return thereto of chemicals, partially or completely treated, as hereinafter more fully referred to.

The rear wall 13 which extends downwardly to the bottom wall 15 is provided with a lower header 22 near the bottom thereof, from which a bank of tubes 23 extends upwardly to an upper header 24.

A bank of tubes 25 arranged near the side walls 11 also extends from the upper header 24, as hereinafter more fully pointed out.

The top wall 14 of the furnace chamber 10 is also provided with a bank of tubes 26 which extends from the upper header 19, as is hereinafter more fully referred to.

The bottom wall 15 of the chamber 10 is formed as a collecting hearth or smelting space 30 and is lined with suitable refractory material such as brick or tile or chrome ore.

As illustrated in Fig. 5 the tubes of the bank of tubes 23, and also the tubes of the banks of tubes 18 and the bank of tubes 21, may have each tube or each alternate tube provided with spaced integral annular horizontally disposed ribs 27 thereon extending outwardly from the tube.

The chrome ore refractory as at 28 may be carried upwardly from the hearth 30 and plastered on the ribs 27 and in the spaces on the tubes between the ribs. This refractory 28 is extended upwardly along the sides of the walls as far as desired to protect and avoid disintegration of the walls under the high temperatures and corrosive conditions prevailing in the lower portion of the furnace chamber 10. Portions of molten material which adhere to the chrome ore refractory will additionally serve to protect the lower portions of the walls.

Beneath the refractory bottom wall 15 a bank of tubes 32 is provided between the lower headers 20 and 22. A spout 31 is provided for the withdrawal of the molten chemicals collecting or depositing on the hearth 30.

Suitable provision is made for introducing air, preferably preheated by the exhaust gases, into the furnace chamber 10 in the lower portion thereof and preferably above the floor 15. A duct 33 is provided on the exterior of the furnace chamber 10 and extends horizontally around the chamber and from this duct suitable small ducts 34, having control dampers 34ᵃ therein, lead to inclined air nozzles 35. One group of air nozzles 35 is provided along and extending through the front wall 12 of the furnace chamber 10, the tubes of the bank of tubes 21 being suitably shaped where necessary to permit the nozzles 35 to be located therebetween.

The air duct 33 also extends along the exterior of the rear wall 13 of the furnace chamber 10 and is provided with a plurality of small ducts 37, having control dampers 37ᵃ therein, which are connected to nozzles 35 which also extend between tubes of the bank of tubes 23 in substantially the same manner as in the front wall 12.

The nozzles 35 which are disposed in the front wall 12 and the rear wall 13 are illustrated in detail in Fig. 5. As there shown the nozzle includes a nozzle holder 36 which is connected by one of the small ducts 34 or 37 to an air duct 33. The nozzle holder 36 preferably has a flange 38 at the forward or inner end thereof so that a removable and renewable nozzle tip member 39 may be inserted in the nozzle holder 36. The nozzle tip member 39 is preferably provided with internal guide flanges 39ᵃ for directing the air passing therealong and for cooling of the nozzle tip member 39. The nozzle tip members 39 are preferably disposed so that the air upon leaving the nozzles is guided in a direction toward the middle or slightly beyond the middle of the hearth space 30.

Suitable provision is made for supplying the waste liquid to the furnace chamber 10. The waste liquid or fluid material for introduction into the furnace has certain characteristics, i. e. it contains combustible organic material, both volatile and non-volatile, combustible inorganic matter, chemicals to be recovered, and water. The apparatus and methods of the present invention are intended primarily for concentrated black liquor derived as waste liquor from the cellulosic or woody fibre separation processes of paper pulp or kraft mills, but they are also suitable for the treatment of other waste fluids such as distillery wastes having the same or similar characteristics.

The structure for supplying the black liquor or similar fluid material preferably takes the form of a plurality of nozzles 40 extending through the side walls 11 of the furnace chamber 10 and to which the fluid is supplied by suitable supply pipes 41. These nozzles 40 are preferably located in the furnace chamber 10 below the middle or center thereof so that the waste fluid material or liquor is introduced into the lower portion of the furnace chamber 10, as hereinafter more fully referred to. The salt cake is preferably mixed with the waste liquor for introduction into the furnace chamber 10 with the waste liquor.

The nozzles 40 are mounted and directed so that the liquor is introduced into the furnace chamber 10 in the most advantageous direction. In practice it has been found that a substantially horizontal disposition of the nozzles produces very satisfactory results.

The nozzles 40 preferably consist of pipes open at their inner ends and without any constrictions or obstacles at the inner ends thereof. The black liquor is supplied in such quantities and at such velocities that it leaves the nozzles in a horizontal direction and falls toward the floor 39, the liquor separating as it falls into coarse particles, as hereinafter more fully pointed out.

An additional furnace chamber 45 is provided which serves as a combustion chamber and to a limited extent as a settling and collecting chamber. The furnace chamber 45 is located above and to the rear of the upper extremity of the rear wall 13 of the furnace chamber 10. The additional furnace chamber 45 comprises a front wall 46, side walls 47, a rear wall 48, a top wall or ceiling 49, and a bottom wall 50.

The walls of the furnace chamber 45 are preferably provided with water cooling tubes for steam generation, as hereinafter more fully pointed out.

The front wall 46 of the chamber 45 is provided with a header 51 to which the bank of tubes 26 is connected, the tubes of this bank being connected at their lower ends to the header 19. The tubes of the bank of tubes 25 which extend upwardly from the header 24 and rearwardly from the front wall 46 and then upwardly and forwardly are also connected to this header 51.

The header 16 is also preferably connected to the header 51 by a suitable bank of tubes 53. The tubes of the bank of tubes 53 extend through the front wall 46 and upwardly, and are spaced inwardly from the front wall 46 below their place of connection to the header 51.

A bank of tubes 52 extends along the upper part of the front wall 46 and along the top wall 49 to the steam space of an upper steam and water drum 55.

The side walls 47 are preferably each provided with a lower header 56 near the bottom thereof and with an upper header 57 at the upper part thereof, and a bank of tubes 58 is provided from the header 56 to the header 57. The uppermost portions of the side walls 47 are provided with a bank of tubes 59 which extend from the upper header 57 to the steam and water drum 55.

The bottom wall 50 of the additional furnace chamber 45 is preferably made of refractory material inclined downwardly toward the front of the chamber 45 at an angle such as to direct and discharge the molten or other material depositing thereon back into the furnace chamber 10.

The rear wall 48 of the chamber 45 is preferably composed of a baffle with an upwardly extending portion and a forwardly directed portion 60. The rear wall 48 is provided with a bank of tubes 61 therein and the tubes extend to the upper steam and water drum 55 and prevent the wall 48 from attaining an excessive or destructive temperature.

Suitable provision is made for introducing air, preferably preheated by the exhaust gases, into the furnace chamber 45 and for this purpose the front wall 46 of the chamber 45 has extending along the exterior thereof a horizontally disposed air duct 65. Small ducts 66 lead from the duct 65 to slots 67 in the lower part of the front wall 46 and between the tubes of the bank of tubes 26. A suitable control damper as at 68 for controlling the quantity of air delivered through the slots 67 is also preferably provided. It has been found that under certain conditions of operation and particularly where the steam generation is not of primary importance that the control damper may be closed.

It will be noted that the character of the upper furnace chamber 45 is such that a substantial reduction of velocity of the gases passing into the furnace chamber 45 is effected, for purposes hereinafter referred to.

The steam generating structure includes the headers and banks of tubes previously mentioned in connection with the furnace chamber 10 and the additional furnace chamber 45, and preferably includes also a boiler section which may be of any desired construction.

The preferred embodiment of the boiler section includes the upper steam and water drum 55, hereinbefore referred to, and a lower water drum 69 disposed below the drum 55. The boiler section has two passes, a bank of riser tubes 70 being arranged in one pass of the boiler section between the drums 55 and 69, and a bank of down-comer tubes 71 being arranged in the other pass of the boiler section between the drum 55 and the drum 69. An additional bank of riser tubes 61 extends from the lower drum 69 along the vertical portion and the inclined portion 60 of the rear wall 48 into the throat or passageway at the upper portion of the furnace chamber 45 and thence to the upper steam and water drum 55. A bank of downcomer tubes 72 extends from the water drum 69 to the lower header 22 and an additional bank of tubes 73 extends from the water drum 69 to the lower headers 56.

The lower portion of the boiler section may be provided with suitable hoppers 74 for the collection and removal of any solid or molten material carried from the furnace chamber 45 into the boiler section and falling therein.

A superheater 76 is preferably also employed and extends downwardly across the passageway leading from the furnace chamber to the boiler section and extends into the central portion of the furnace chamber 45. The steam and water drum 55 is connected by a suitable pipe 77 to the superheater 76.

The steam generating structure preferably includes also an economizer arranged to the rear of the boiler section and having two passes. The economizer has an upper drum 80 which is connected to the upper steam and water drum 55 of the boiler section by a bank of tubes 81 which lines the upper wall of the passageway connecting the second pass of the boiler section to the economizer section and connects the drums 55 and 80 above the water line. An additional bank of tubes 82 connects the drums 55 and 80 below the water line.

The economizer also has a lower drum 83 arranged below the upper drum 80. A baffle 84 extends downwardly from the upper drum 80 to a location spaced above the lower drum 83, and this baffle 84 separates the tubes extending between the drum 80 and the drum 83 into a bank of riser tubes 85 and a bank of downcomer tubes 86.

The economizer may have, at the bottom thereof, a suitable hopper 87 for the collection of any material falling thereinto.

An air heater 90 is provided for preheating the air which is supplied through the nozzles 40 to the furnace chamber 10 and through the slots 67 to the furnace chamber 45. The air heater 90 is arranged to the rear of the economizer section for receiving the hot gases therefrom and is provided with suitable heat exchanging surfaces, which may take the form of tubes, the air being brought in contact with one side thereof and the hot gases with the other side thereof in a well known manner. The air heater 90 may also have a suitable hopper 91 at the bottom thereof for the removal of any material which falls thereinto.

An induced draft fan 92 is provided, between the gas duct 93, which leads from the air heater 90, and the stack 94. A forced draft fan 95 is also provided for supplying air under pressure to the air heater 90 and thence, after preheating, through air ducts 96 and 97 to the ducts 33 and 65 for introduction into the furnace chamber 10 and the additional furnace chamber 45, respectively.

The mode of operation of the structure herein disclosed and the method of recovering waste heat and chemicals by the operation thereof will now be set forth.

Before the system is operated in the desired manner it is necessary that the furnace chamber 10 be preheated and brought to a temperature such that continuous operation may be effected without the necessity for supplying fuel to the system in addition to the combustibles supplied in and by the waste liquid. This may be accomplished in any desired manner.

The waste liquid previously concentrated in suitable apparatus (not shown) to reduce the water content is supplied to the furnace chamber 10 through the nozzles 40. The nozzles 40 have their ends substantially horizontally disposed and the waste liquid passing therefrom in an unconstricted stream tends to fall toward the hearth space 30 in a trajectory path. The liquid upon leaving the nozzles tends to separate of its own accord into relatively coarse particles, this separation apparently being due to the action of surface tension, the force of gravity, and the vaporization of the water content by the high temperatures prevailing in this portion of the furnace chamber 10.

A bed or pile of residues consisting of dehydrated and partly treated material, from which the water and volatiles have been driven off in the passage of the material from the nozzles to the pile and containing chemicals and solid combustibles, is built up and maintained on the hearth space 30, with the resultant material derived from the liquid introduced at the nozzles 40 continuously supplied to the top of the bed.

In the passage of the waste liquid particles downwardly from the nozzles 40 toward the bed volatile and combustible constituents, including organic and inorganic combustibles, are also driven off while the separation into coarse particles is taking place and the gaseous constituents pass upwardly into the upper part of the furnace chamber 10 where combustion thereof is effected.

Air introduced through the nozzles 35 at relatively high velocity to increase its penetrating ability is directed against the lower portion of the bed at the bottom thereof and effects a burning of the included carbonaceous material as well as any other combustible material remaining therein, and also effects a smelting of the chemicals for delivery through the spout 31. The hot gases consisting of burning and partly burned combustibles passing upwardly from the lower part of the bed as well as the radiant heat of the combustion of combustible materials in and near the pile or bed are effective for the drying of the waste liquid in its passage from the outlets of the nozzles 40 to the pile or bed and for the driving off of the combustible and non-combustible volatiles. A portion of the air entering at the air nozzles 35 also combines with the combustible materials driven off by the drying and treatment of the waste liquor in the course of the passage toward the pile or bed so that the furnace chamber 10 above the bed on the hearth 30 is substantially filled with a flame composed of burning material.

The quantity of air supplied through the air nozzles 35 at the lower portion of the furnace chamber 10 may be regulated as desired by dampers 34$^a$ and 37$^a$ to provide and maintain the desired quantity of combustion supporting oxygen within the furnace chamber 10.

The purpose of the spraying of the waste liquid or black liquor in this manner is to effect vaporization of the water content remaining after concentration, to volatilize the volatile constituents of the waste or black liquor, and to initiate the separation or splitting up for burning and burning of the combustible organic constituents of the black or waste liquor.

The burning materials passing upwardly through the falling black or waste liquor supplied by the nozzles 40 continue their burning as they move upwardly through the upper portion of the furnace chamber 10, and as they pass into the furnace chamber 45 where the burning also continues.

A small quantity of recoverable chemicals, particularly when the system is operated at very high rating, may be carried upwardly with the ascending stream of hot and burning material and upon the entry into the second furnace chamber 45 the velocity of the advancing stream is reduced by the increased cross sectional area of the path, while at the same time additional air introduced into the second furnace chamber through the air nozzles 67 supplies the additional air which is desired for completing the combustion of any unconsumed combustibles passing with the advancing gaseous stream in the second furnace chamber 45.

The air introduced into the second furnace chamber increases the efficacy of the steam generation and in some instances where the steam generation is not an important consideration may be shut off.

Any small quantities of chemicals which may have been carried into the second furnace chamber 45 by reason of the small sizes of the particles and the velocity of the advancing gaseous stream in the furnace chamber 10 tend to separate out in the second furnace chamber 45 through which the gaseous material passes at reduced velocity and fall to the inclined floor 50. These chemicals then move down the floor 50 and are returned to the first furnace chamber 10 for recovery.

The supply of air to the additional furnace chamber 45 is regulated and controlled, as desired, by means of suitable dampers as at 68 and particularly so that substantially complete combustion of any unconsumed combustible materials introduced into this chamber is effected.

It is to be noted that in the furnace chamber 45 by reason of its character and shape, as well as the introduction of air to the slots 67, sufficient turbulence is maintained to bring the particles of unconsumed combustible materials into intimate contact with the air introduced into the furnace chamber 45 through these slots 67. The hot gases, substantially free from the chemicals desired to be recovered, pass out the top of the furnace chamber 45 and to the boiler section. In the boiler section the hot gases pass downwardly in contact with the bank of riser tubes 70 of the boiler section, then upwardly in contact with the downcomer tubes 71 of the boiler section, and thence into the economizer section.

In the economizer section the partially cooled gases pass downwardly in contact with the riser tubes 85 around the lower edge of the baffle 84 then upwardly in contact with the downcomer tubes 86 and thence into the air preheater 90.

In the air preheater 90 the gases pass downwardly in contact with the heat exchange surfaces thereof for preheating the air supplied to the furnace chamber 10 and to the furnace chamber 45. The gases then pass to the duct 93, the induced draft fan 92, and thence into the stack 94 for discharge.

While substantially all of the chemicals in molten form and free from combustible material are recovered through the spout 31, if any minute quantities of the chemicals are carried beyond the furnace chamber 45 and are precipitated upon the cooling of the gases during the absorption of heat therefrom in the boiler section, in the economizer section and in the air preheater they may be removed from the hoppers 74, 87 and 91 without interfering with the continuous operation of the system.

I claim:

1. The process of recovering heat and chemicals in a multiple chamber furnace from waste liquid containing combustible constituents and chemicals to be recovered which includes providing a bed of dehydrated material containing recoverable chemicals and combustibles in the lower portion of a furnace chamber, supplying waste liquid substantially free from contact of the liquid with the furnace chamber walls to the lower portion of said furnace chamber toward the top of the bed, effecting dehydration of the liquid during said downward travel toward the bed, supplying air to said furnace chamber at the lower part only thereof externally of the bed and directed against the exposed lower part of the bed for burning at the lower part of the bed the combustible constituents of the dehydrated material and for burning above the bed and in the upper part of said furnace chamber the combustible constituents freed from the waste material, advancing the gaseous stream to a second furnace chamber and changing the direction of travel of the gaseous stream in its passage from said other furnace chamber, and supplying air directly to the second furnace chamber for the combustion in said chamber of the unconsumed combustible constituents passing therein.

2. The process of recovering heat and chemicals in a furnace from waste liquid containing combustible constituents and chemicals to be recovered which includes spraying the waste liquid into a furnace chamber intermediate the upper and lower extremities thereof in an unconstricted and self separating stream substantially free from contact of the liquid with the chamber walls, effecting dehydration of the liquid and separation of volatile constituents thereof immediately subsequent to said spraying discharge of said waste liquid and during the downward travel, collecting solid residues in the lower part of said chamber, supplying air to said furnace chamber at the lower part only thereof below the liquid spray externally of the bed and directed against the exposed lower part of the bed for combustion of solid combustible constituents and smelting of the chemicals in the solid residues in the lower part of the furnace chamber and for combustion in the upper part of said furnace chamber and above the collected solid residues and the discharged waste liquid of other combustible constituents.

3. The process of recovering heat and chemicals in a furnace from waste liquid containing combustible constituents and chemicals to be recovered which includes spraying the waste liquid into a furnace chamber intermediate the upper and lower extremities thereof in an unconstricted and self separating falling stream for direct delivery by gravity to the lower portion of the chamber, effecting dehydration of the liquid and separation of volatile constituents thereof immediately subsequent to said discharge of said waste liquid and during the downward movement of the solid constituents of said stream, collecting the solid constituents on a bed at the lower part of the furnace chamber, supplying air to said furnace chamber at the lower part only thereof and below the liquid spray externally of the bed and directed against the exposed lower part of the bed for combustion of solid combustible constituents and smelting of the chemicals in the lower part of the furnace chamber and for combustion in the upper part of said furnace chamber and above the incoming waste liquid spray of other combustible constituents, and withdrawing the gases at the upper part of said furnace chamber.

4. The process of recovering heat and chemicals in a multiple chamber furnace from waste liquid containing combustible constituents and chemicals to be recovered which includes discharging the waste liquid into a furnace chamber intermediate the upper and lower extremities thereof in an unconstricted and self separating stream, dehydrating the liquid and separating the volatile constituents thereof immediately subsequent to said discharge of said waste liquid and during the downward movement of said stream, collecting solid residues in the lower part of said furnace chamber, supplying air to said furnace chamber at the lower part only thereof and below the liquid discharge for combustion of the combustible constituents of the solid residues and smelting of the chemicals in the lower part of the furnace chamber and for combustion above the collected solid residues and the liquid discharge and in the upper part of said furnace chamber of other combustible constituents, advancing the gaseous stream to a second furnace chamber out of alinement with said other furnace chamber, supplying air directly to the second furnace chamber for the combustion therein of unconsumed combustible constituents, and collecting non-gaseous material in the second furnace chamber and returning the same to the first furnace chamber.

5. A waste heat and chemical recovery furnace for the treatment of waste liquid containing combustible constituents and chemicals to be recovered comprising a vertical furnace chamber, means in the lower portion of said chamber for supplying waste liquid into said furnace chamber in an unrestricted stream, means for supplying air at the lower portion of said furnace chamber for the combustion in the lower portion of said chamber of the solid combustibles and in the upper portion of said chamber of the other combustibles, a second furnace chamber offset from said first furnace chamber and in communication with the upper portion of said first furnace chamber for receiving gaseous fluids at high temperature from said first furnace chamber, means in the wall of said second furnace chamber for supplying air into said second furnace chamber for completing the combustion of the combustible portions of the gaseous fluids passing into said chamber from said first furnace chamber, and means in said second chamber for collecting and returning to the first furnace chamber non-gaseous materials including chemicals to be recovered.

6. Apparatus for the recovery of heat and chemicals from waste liquids containing combustibles and recoverable chemicals comprising a first furnace chamber having a plurality of enclosing walls, said walls being provided with means for generating steam, means in the middle portion of said furnace chamber for supplying waste liquid into the lower part of said furnace chamber, means for supplying air to said furnace chamber at the lower part thereof and below said liquid supplying means for combustion of the combustible constituents, means at the bottom of said chamber providing a smelting and collecting space for the chemicals, a second furnace chamber having a plurality of enclosing walls and in communication with said first furnace chamber, said second furnace chamber being provided with means for generating steam, and means for supplying air into said second furnace chamber for completing combustion of combustibles passing thereto, said second furnace chamber having an inclined bottom wall for returning non-gaseous material depositing thereon to said first furnace chamber.

7. Apparatus for the recovery of heat and chemicals from waste liquids containing combustibles and recoverable chemicals comprising a first furnace chamber having a plurality of enclosing walls, banks of tubes for cooling said walls and for generating steam, means for supplying waste liquid to said furnace chamber, means for supplying air to said furnace chamber for combustion and recovery of chemicals, means in said chamber providing a collecting space for the chemicals to be recovered, a second furnace chamber having a plurality of enclosing walls, banks of tubes for cooling said walls and for generating steam, the walls of said furnace chambers having openings for providing communication between said furnace chambers, and means for supplying air to said second furnace chamber for completing combustion of the combustibles passing into said chamber from said first furnace chamber, the bottom wall of said second furnace chamber being inclined downwardly in the direction of said first furnace chamber for returning to said first furnace chamber non-gaseous materials depositing on said bottom wall.

8. Apparatus for the recovery of heat and chemicals from waste liquids containing combustibles and recoverable chemicals comprising a first furnace chamber having a plurality of vertical enclosing walls, headers at the lower portions of said walls, banks of tubes for cooling said walls and for generating steam, said banks including tubes connected to said headers, means for supplying waste liquid to said furnace chamber, means for supplying air to said furnace chamber for combustion of combustible constituents of the waste liquid and recovery of chemicals therefrom, means at the bottom of said chamber for collecting the chemicals to be recovered, a bank of tubes extending between two of the aforesaid headers and below said collecting means, a second furnace chamber, said second furnace chamber having a plurality of enclosing walls, banks of tubes for cooling said walls and for generating steam, the walls of said furnace chambers having openings for providing communication between said furnace chambers, and means for supplying air to said second furnace chamber for completing combustion of combustibles delivered into said second furnace chamber, the bottom wall of said second furnace chamber being inclined downwardly in the direction of said first furnace chamber for returning to said first furnace chamber non-gaseous materials depositing on said bottom wall.

9. Apparatus for the recovery of heat and chemicals from waste liquids containing combustibles and recoverable chemicals comprising a first furnace chamber having a plurality of enclosing walls, banks of tubes for cooling said walls and for generating steam, means in an opposed pair of side walls for supplying waste liquid to said furnace chamber, means for supplying air to said furnace chamber for combustion of combustible constituents of the waste liquid and recovery of chemicals therefrom, means in said chamber for collecting the chemicals to be recovered, a second furnace chamber offset to one side of the upper portion of said first furnace chamber, said second furnace chamber having a plurality of enclosing walls, banks of tubes for cooling said walls and for generating steam, the walls of said furnace chambers having openings for providing communication between said furnace chambers, and means in a wall of said second furnace chamber for supplying air to said second furnace chamber for completing combustion of combustibles delivered into said second furnace chamber.

10. Apparatus for the recovery of heat and chemicals from waste liquids containing combustibles and recoverable chemicals comprising a first furnace chamber having a plurality of enclosing walls, banks of tubes for cooling said walls and for generating steam, means in an opposed pair of side walls for supplying waste liquid to said furnace chamber, means for supplying air to said furnace chamber for combustion of combustible constituents of the waste liquid and recovery of chemicals therefrom, means in said chamber for collecting the chemicals to be recovered, a second furnace chamber offset to one side of said first furnace chamber, said second furnace chamber having a plurality of enclosing walls, banks of tubes for cooling said walls and for generating steam, the walls of said furnace chambers having openings for providing communication between said furnace chambers, means in a wall of said second furnace chamber for supplying air to said second furnace chamber for completing combustion of combustibles delivered into said second furnace chamber, and means in said second furnace chamber for collecting additional quantities of chemicals to be recovered.

11. A waste heat and chemical recovery furnace for the treatment of waste liquids containing combustible constituents and chemicals to be recovered comprising a furnace chamber, means for supplying waste liquid into said furnace chamber at the intermediate portion thereof, means for supplying air to said furnace chamber at the lower portion thereof for combustion in said chamber of gaseous and solid combustible constituents, a second furnace chamber in communication with said first furnace chamber for receiving burning gaseous material at high temperature from said first furnace chamber, means in a wall of said second furnace chamber for supplying air to said second furnace chamber for completing the combustion of the combustible portions of the gaseous material passing into said chamber from said first furnace chamber, means in said second furnace chamber for collecting and returning to the first furnace chamber non-gaseous materials including chemicals to be recovered, said means including a bottom wall in said furnace chamber inclined downwardly in the direction of said first furnace chamber for returning non-gaseous materials to said first furnace chamber.

12. A waste heat and chemical recovery furnace for the treatment of waste liquids containing combustible constituents and chemicals to be recovered comprising a furnace chamber having a plurality of enclosing walls, means for supplying waste liquid into said furnace chamber at the intermediate portion thereof and through an opposed pair of side walls, means for supplying air to said furnace chamber at the lower portion thereof for combustion in said chamber of gaseous and solid combustible constituents, a second furnace chamber offset to one side of and in communication with said first furnace chamber for receiving burning gaseous material at high temperature from said first furnace chamber, means for supplying air directly to said second furnace chamber for completing the combustion of the combustible portions of the gaseous material passing into said chamber from said first furnace chamber, and means in said second furnace chamber for collecting non-gaseous materials including chemicals to be recovered, said means including a downwardly inclined bottom wall in said second furnace chamber.

13. Apparatus for the recovery of heat and chemicals from waste liquids containing combustibles and recoverable chemicals including a vertical furnace chamber having a bottom floor for collecting and supporting in mound form dehydrated chemical and combustible material and a plurality of vertical enclosing walls, spray nozzles at the middle portion of said furnace chamber for spraying waste liquid into said furnace chamber from opposite sides thereof in unrestricted streams for delivery by gravity towards said bottom floor and onto the mound in dehydrated condition, air nozzles for supplying air to said furnace chamber at the lower part only thereof and below said waste liquid spray nozzles for combustion of solid combustibles and smelting in the lower portion of said furnace chamber and for combustion of other combustibles in the upper portion of said furnace chamber, said air nozzles being disposed in opposed vertical enclosing walls downwardly inclined in a direction towards the center of said floor and terminating adjacent said vertical walls to cause said air to impinge against the exposed lower part of the collected material on the bottom floor, and means for withdrawing chemicals in molten form from said furnace chamber.

14. Apparatus for the recovery of heat and chemicals from waste liquids containing combustibles and recoverable chemicals including a first vertical furnace chamber having a bottom floor for collecting and supporting in mound form dehydrated chemical and combustible material and a plurality of vertical enclosing walls, spray nozzles at the middle portion of said first furnace chamber for spraying waste liquid into said first furnace chamber from opposite sides thereof in unrestricted streams for delivery by gravity towards said bottom floor and onto the mound in dehydrated condition, air nozzles for supplying air to said first furnace chamber at the lower part only thereof and below said waste liquid spray nozzles for combustion of solid combustibles and smelting in the lower portion of said first furnace chamber and for combustion of other combustibles in the upper portion of said first furnace chamber, said air nozzles being disposed in opposed vertical enclosing walls downwardly inclined in a direction towards the center of said floor and terminating adjacent said vertical walls to cause said air to impinge against the exposed lower part of the collected material on the bottom floor, a second furnace chamber offset from said first furnace chamber and in communication with the upper portion of said first furnace chamber for receiving gaseous fluids at high temperature from said first furnace chamber, said second furnace chamber having a plurality of enclosing walls, means in the wall of said second furnace chamber for supplying air into said second furnace chamber for completing the combustion of the combustible portions of the gaseous fluids passing into said second furnace chamber from said first furnace chamber, and means for withdrawing chemicals in molten form from said first furnace chamber.

JOHN PHILLIPS BADENHAUSEN.